United States Patent
Eriksson

(10) Patent No.: US 7,424,405 B2
(45) Date of Patent: Sep. 9, 2008

(54) METHOD AND ARRANGEMENT FOR SIGNAL PROCESSING COMPRISING FIRST AND SECOND PULSE COMPRESSION FILTERS

(75) Inventor: Stefan Eriksson, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 273 days.

(21) Appl. No.: 10/582,132

(22) PCT Filed: Dec. 16, 2003

(86) PCT No.: PCT/SE03/01958

§ 371 (c)(1), (2), (4) Date: Jun. 8, 2006

(87) PCT Pub. No.: WO2005/059587

PCT Pub. Date: Jun. 30, 2005

(65) Prior Publication Data

US 2007/0080853 A1    Apr. 12, 2007

(51) Int. Cl.
*G06F 15/00* (2006.01)
(52) U.S. Cl. .................. 702/190; 342/139; 342/159; 375/240
(58) Field of Classification Search .......... 702/190; 342/139, 159; 375/240
See application file for complete search history.

(56) References Cited

U.S. PATENT DOCUMENTS

| | | | |
|---|---|---|---|
| 4,096,478 A | 6/1978 | Chavez | |
| 4,359,735 A | 11/1982 | Lewis et al. | |
| 5,502,747 A | 3/1996 | McGrath | |
| 7,308,046 B1 * | 12/2007 | Studenberg, Jr. | ............ 375/320 |

OTHER PUBLICATIONS

International Search Report for PCT/SE2003/001958 dated Jul. 15, 2004.

* cited by examiner

*Primary Examiner*—Thomas H. Tarcza
*Assistant Examiner*—Timothy A Brainard
(74) *Attorney, Agent, or Firm*—Nixon & Vanderhye, P.C.

(57) ABSTRACT

The invention refers to a method and an arrangement for signal processing for a target detecting device (1) where a return signal (8) is divided into two parallel branches where a first compression filter (15) compresses the signal in the first branch and where a second compression filter (17) compresses the signal in the second branch. The second compression filter (17) compresses the return signal (8) to a higher degree than the first compression filter (15). A delay filter (19) delays the first compressed signal (16a) compensating for a delay $\Delta T$. Detectors (21, 22) processes the compressed signals (16b, 18) giving rise to detector signals (21, 23). The detector signals are compared and the minimum value of the compared detector signals (21, 23) is selected for all time frames, giving rise to a first output signal (25) comprising the minimum values from the first and second detector signals (21, 23).

18 Claims, 4 Drawing Sheets

METHOD AND ARRANGEMENT FOR SIGNAL PROCESSING COMPRISING FIRST AND SECOND PULSE COMPRESSION FILTERS

This application is the U.S. national phase of international application PCT/SE2003/001958 filed 16 Dec. 2003, which designated the U.S., the entire content of which is hereby incorporated by reference.

TECHNICAL FIELD

The invention refers to a method for signal processing for a target detecting device comprising the steps of:
  receiving a return signal from a transmitted coded pulse;
  compressing the signal in a first compression filter giving rise to a first compressed signal;
  compressing the signal in a second compression filter parallel to the first compression filter giving rise to a second compressed signal.

The invention also refers to a signal processing arrangement for using the inventive method.

BACKGROUND ART

In the field of signal processing, it is of the utmost importance to be able to separate actual signals from noise. Electronic filters are used to modify the characteristics of an incoming signal so as to provide an output signal which is modified in some defined fashion. In the field of target detection devices such as radar and sonar, a pulse is sent out in a certain direction whereupon the pulse is reflected on, for example, a target and whereupon the reflected pulse is received by a receiving unit. The receiving unit transforms the received pulse into an electronic signal, for example a complex video signal. The video signal is then processed by the utilisation of a number of components, one of which is a filter. The pulse that is sent out is normally coded in order to enable suitable signal processing on the video signal. The coding may be in the form of for example, frequency coding or binary coding. The filter is then chosen such that the filter utilises the coding for different tasks. One such task is pulse compression which is done by adapting the filter to the coding, and is utilised in order to gain a better range resolution for long pulses.

Pulse compression is well known in prior art, as is the problem of forming of side lobes when using pulse compression. This characteristics of the filter is crucial regarding the forming of side lobes. The shorter the filter the higher the side lobes before and after the main lobe. However, the shorter the filter the shorter the range of side lobes before and after the main lobe. The shorter filter however yields a better sensitivity than a longer filter, especially when it is matched to the outgoing pulse coding filter. The previously known filters have to be adapted in regard to the trade off between the sensitivity and the presence of the side lobes. If the filter is too short, the side lobes will prevent possible detection of weak return signals (in the side lobe ranges/regions) near a strong signal, i.e. the ratio between the main lobe amplitude and the side lobe amplitude is very small. However, if the filter is long the ratio between the main lobe amplitude and the side lobe amplitude is high, but with the disadvantage of an extended side lobe range. The ratio may be discussed in terms of main lobe level (MLL) versus side lobe level (SLL), where a relative increase in the SLL to the MLL gives a decrease in the ratio and vice versa.

U.S. Pat. No. 5,502,747 teaches a digital filter with long impulse response and low latency using Fast Fourier Transformation or Modified Discrete Fourier Transformation. The filter comprises a number of components in parallel and operates by combining their outputs by addition. U.S. Pat. No. 5,502,747 does not teach anything that remedies the trade off problem discussed above, but the problem of choosing a suitable filter length still prevails.

U.S. Pat. No. 4,359,735 teaches a digital pulse compression processor for reducing the processing loss in target-echo signals in a radar or sonar system. The processor uses pulse compression on two channels with clock signals on the same and predetermined Nyqvist frequency. The second channel has its pulses interlaced in time, approximately midway between the pulses of the first clock signal. According to the document, the interlaced sampling periods give rise to reduced sampling error. The document teaches addition of I and Q signals on both channels and multiplication of the added signals after taking the square root on each added signal. U.S. Pat. No. 4,359,735 does not teach anything that remedies the trade off problem discussed above, but the problem of choosing a suitable filter length still prevails.

Hence, there still remains a need for a better signal processing arrangement and a better method when using pulse compression in order to increase the MLL to SLL ratio with an acceptable sensitivity and range resolution.

DISCLOSURE OF INVENTION

The invention is intended to remedy the above described problems for target detecting devices such as radar or sonar. The problem is solved by a method for signal processing and a signal processing arrangement comprised in or connected to the target detection device. The target-detecting device comprises means in the form of a coding filter and an antenna, intended to be used for transmitting the coded pulse. The coding filter has a certain length and codes an electrical signal that generates a corresponding coded pulse sent out by the antenna. If the target-detecting device is in the form of a radar, the coded pulse is in the form of an electromagnetic pulse, and if the target detecting device refers to a sonar, the coded pulse is in the form of an acoustic pulse. The coding may be in the form of for example, frequency coding or binary coding.

The transmitted pulse reflects on a target and is then received by a receiving antenna comprised in the target detecting device. The receiving antenna may be the same antenna as the one transmitting the pulse, or a separate antenna at a distance from the transmitting antenna. The received reflected pulse is then converted to a return signal in a conversion device comprised in the target detecting device. The conversion device may be adapted to convert an electromagnetic pulse from a radar, or may be adapted to convert an acoustic pulse from a sonar. In both cases, the return signal is an electrical signal comprising phase information, for example the well-known quadrature signal I+jQ, and is also commonly known as a complex video signal.

According to a first embodiment of the invention, the return signal is divided into two identical signals, a first signal and a second signal. The signal processing arrangement according to the invention comprises a first compression filter arranged for compressing the first signal and giving rise to a first compressed signal. The signal processing arrangement further comprises a second compression filter parallel to the first compression filter arranged for compressing the second signal giving rise to a second compressed signal.

The second compression filter is arranged to compress the return signal to a higher degree than the first compression filter, wherein a delay ΔT between the first compressed signal and the second compressed signal arises due to the difference in compression between the first and the second compression filter. As is known from prior art, a compressed signal comprises a main lobe and a number of side lobes. In order to utilise the invention the first and second compressed signals need to be synchronised such that the apexes of the main lobes coincide. Therefore, the signal processing arrangement comprises a delay filter arranged to delay the first compressed signal compensating for the delay ΔT. Furthermore, the two filters should also, for best performance, be equalised such that the power of the main lobe in the signal from the first filter is equal to the power of the main lobe in the signal from the second filter. This may be done by any known equaliser means.

In prior art it is known that a compression filter is used to decode the return signal emanating from the coded transmitted pulse. The compression filter is adapted to decode the signal in dependence of the type of coding in the coding filter. For example, if the coding filter uses frequency coding, the compression filter resolves the return signal by the use of a frequency based filter. If the coding filter, however, uses binary coding, the compression filter resolves the return signal by the use of a binary code based filter. The compression filter may be referred to as having a certain length. For example, a compression filter that matches the coding filter has a length that corresponds to the length of the previously transmitted code received and converted to an electrical signal. In the case of binary coding, the coding filter may comprise a number of segments corresponding to, so called, sub pulses. Each segment is coded with a "+" or "−" corresponding to the phase of each code segment, and in the case with the matched filter, the compression filter comprises the same number of segments, i.e. the same number of plus (+) and minus (−), i.e. the matched compression filter has the same length as the coding filter. A compression filter may also be labelled short or long relative a second filter. Referring now to the example above regarding binary coding, a longer filter has more segments than the shorter filter.

The above stated "higher degree" compression refers to differences in filter length between the first compression filter and the second compression. The first compression filter is short relative the second compression filter and thus yields high side lobes in a short range before and after the main lobe. The second compression filter is longer than the first compression filter and is chosen such that it yields low side lobes but over a longer range before and after the main lobe, compared to the short filter. The longer compression filter thus compresses the return signal to a higher degree than the shorter filter.

According to the first embodiment, a first detector is arranged to process the delayed first compressed signal (i.e. the first compressed signal after the delay filter) by forming the square or absolute value of the delayed first compressed signal, giving rise to a first detector signal. Furthermore, a second detector is arranged to process the second compressed signal by forming the square or absolute value of the second compressed signal, giving rise to a second detector signal.

The invention according to the first embodiment also comprises a comparison device arranged to compare the first detector signal to the second detector signal for all corresponding time frames. The comparison device is arranged to select the minimum value of the compared detector signals for all time frames. The comparison device gives rise to a first output signal comprising the minimum values from the first and second detector signals for all time frames.

The time frames refer to the bandwidth of the comparison device. The bandwidth may be determined by the well known Nyqvist criteria. The time frames are thus dependent on the sample frequency used by the comparison device. Each time frame corresponds to a certain point (or time interval) in time during the time period where the comparison device selects a minimum value of the compared detector signals. The time period refers to the duration of the detector signals, which corresponds to each segment (the sub pulse) of the coded pulse sent out by the antenna.

The advantage of the invention lies in that the first output signal comprises a high ratio between the main lobe amplitude and the side lobe amplitude without compromising the sensitivity. In other words, the Side Lobe Level (SLL) is low without compromising, the SNR. Further advantages are that the method according to the invention does not require any changes in the used pulse shape (as in prior art), but need only more compression channels. Here channels refer to the different branches in which the return signal is divided. The compression channels thus use compression filters with different length and different range side lobe characteristics, which gives the advantage of lower side lobes and narrower side lobe regions in a given system using pulse compression.

The amplitude of the main lobe is either more or less unaffected, or compensated by the equalising means, when using filter lengths within reasonable ranges, but the amplitude of the side lobes changes dramatically.

As has been described above, the SLL region increases in range with increased filter length. The comparison device selects the minimum value when comparing the first detector signal to the second detector signal for each time frame in the detector signal. Since the amplitude of the main lobe, according to the above, is more or less the same in the two signals, the minimum value of the main lobe for the first detector signal is more or less the same as for the main lobe of the second detector signal. However, the amplitudes for the side lobes and the extent of the side lobe regions for the different filter lengths are different. By choosing the minimum value for all time frames, the side lobes with the least amplitude is always chosen for each time frame, at the same time as the amplitude of the main lobe is virtually unaffected. This yields the advantage of the highest possible ratio between the main lobe amplitude and the side lobe amplitudes. The invention thus gives the result that in the side lobe regions corresponding to the first compression filter, the side lobe amplitudes in the output signal always corresponds to the lowest side lobe levels, i.e. normally the side lobe levels from the second compression filter. Furthermore, outside the side lobe regions corresponding to the first compression filter, the side lobe amplitudes in the output signal are virtually zero due to the fact that the first compression filter has no signal outside said side lobe region.

The first compression filter is optimised with regard to sensitivity, but has the disadvantage of high side lobes. The second compression filter is optimised with regard to low side lobes, but has the disadvantage of loss of SNR and extended side lobe regions. The selection of the minimum value for each time frame gives the lowest possible side lobes with a maintained resolution and sensitivity. The fact that the main lobe is more or less unaffected (in some cases after equalising) by the changes of filter length thus yields a higher ratio between the main lobe and the side lobes in the compared to the use of the first compression filter (the shorter filter) only.

The first compression filter may be optimized by, for example, maximising the SNR. However, the first compression filter should be optimized such that the first compression filter has zero response outside one code length from the main lobe. The length of the first compression filter therefore advantageously corresponds to the transmitted coded pulse, i.e. to the length of the coding filter. The first compression filter may however be somewhat shorter or somewhat longer than the coded pulse. In the case of binary coding, the first compression filter may utilize so called Barker codes or any other code that yields low side lobes without compromising the amplitude of the main lobe.

The second compression filter is preferably optimized to provide low side lobes close to the main lobe. The length of the second compression filter is preferably at least three times the length of the first compression filter yielding low side lobes over the entire side lobe regions corresponding to the short compression filter, i.e to the first compression filter. The second compression filter may use the above frequency and binary filters, or code inverse filtering method utilised by fourier transformation on a FIR filter, or any other pulse compression scheme.

In a second embodiment of the invention, a memory device is arranged to store the selections made by the comparison device when selecting the minimum values for all time frames. The memory device stores the selections as a chronologic sequence of choices. For example, when the comparison device selects the first detector signal for the first time frame and the second time frame, and the second detector signal for the third time frame, the memory device stores these choices in a sequence according to:

|  | Time frame | | |
| --- | --- | --- | --- |
|  | 1 | 2 | 3 |
| Detector signal | 1 | 1 | 2 |

A control device may then be added to the signal processing arrangement where the control device is arranged to use the stored sequence of selections when the signal processing arrangement processes a return signal from a second coded pulse following the first coded pulse. The control device is used for controlling the comparison device such that the first or the second detector signal from the second coded pulse is selected on basis of the sequence of selections, thereby giving rise to a second output signal dependent on the selections made when processing the return signal from first coded pulse. The control device maintains coherence between the two signals making it possible to utilise MTI filtering or other signal processing schemes requiring coherence between pulses.

The memory device and the control device may be used for a clutter suppressing device where the first output signal and the second output signal is processed as coherent signals in order to suppress clutter, for example by Doppler filtering.

The benefits of the invention declared above are of great importance for the process of clutter suppression.

BRIEF DESCRIPTION OF DRAWINGS

The invention will be described in the following with reference to a number of drawings, where.

MODES FOR CARRYING OUT THE INVENTION

Figure 1:
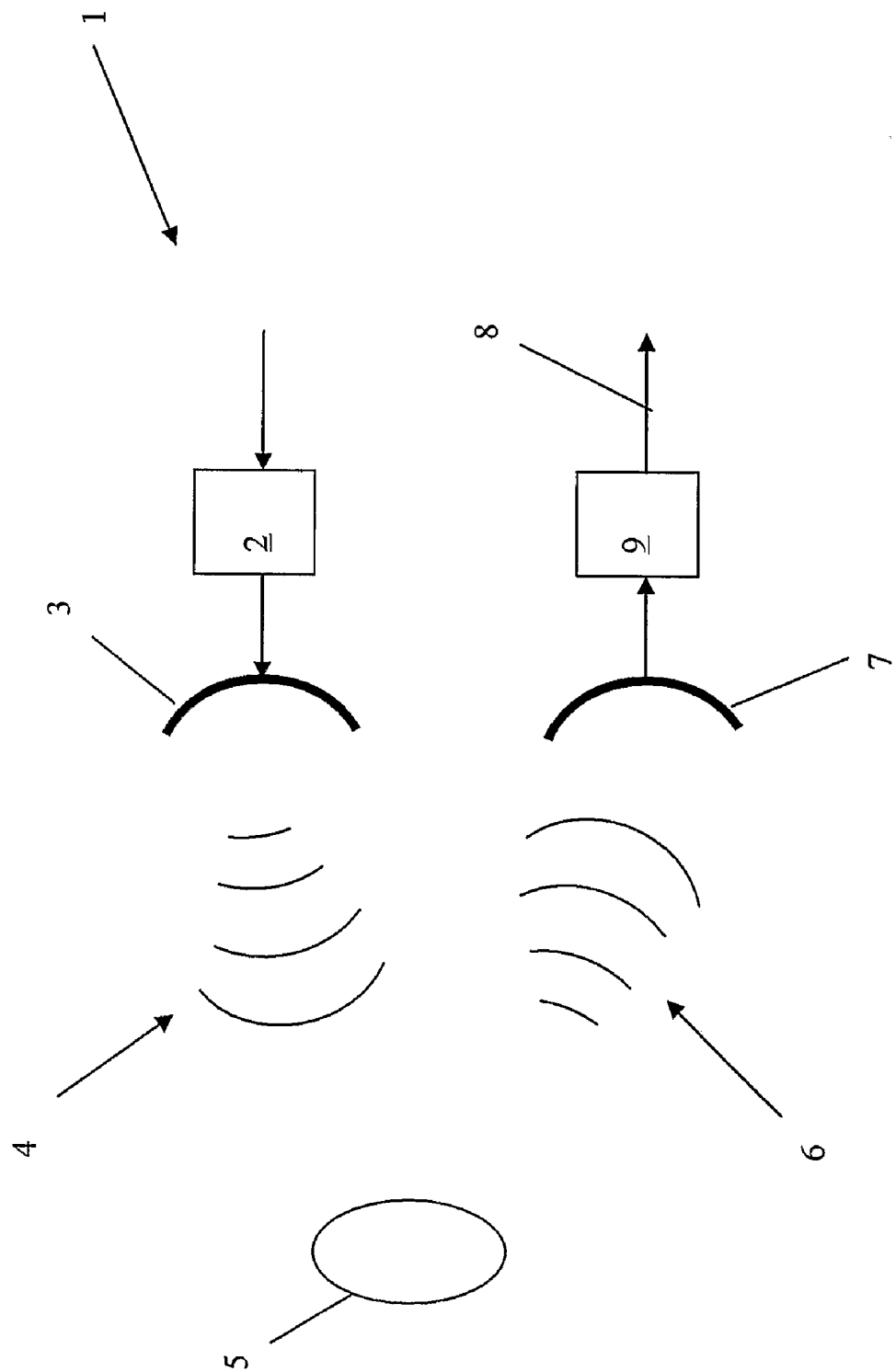
FIG. 1 schematically shows a target detecting device such as a radar or a sonar.

FIG. 1 schematically shows a target detecting device 1 such as a radar or a sonar. The target detecting device 1 comprises means in the form of a coding filter 2 and an antenna 3, intended to be used for transmitting a coded pulse 4. The coding filter codes a signal that generates a corresponding coded pulse sent out by the antenna 3. If the target detecting device 1 is in the form of a radar, the coded pulse 4 is in the form of an electromagnetic pulse, and if the target detecting device 1 refers to a sonar, the coded pulse 4 is in the form of an acoustic pulse.

In FIG. 1 the transmitted coded pulse 4 reflects on a target 5 and the reflected pulse 6 is then received by a receiving antenna 7. The received reflected pulse 6 is then converted to a return signal 8 in a conversion device 9. The conversion device 9 may convert the received pulse to an electrical signal by any known means. The processing of the return signal is explained in connection to FIGS. 2 and 3.

Figure 2:
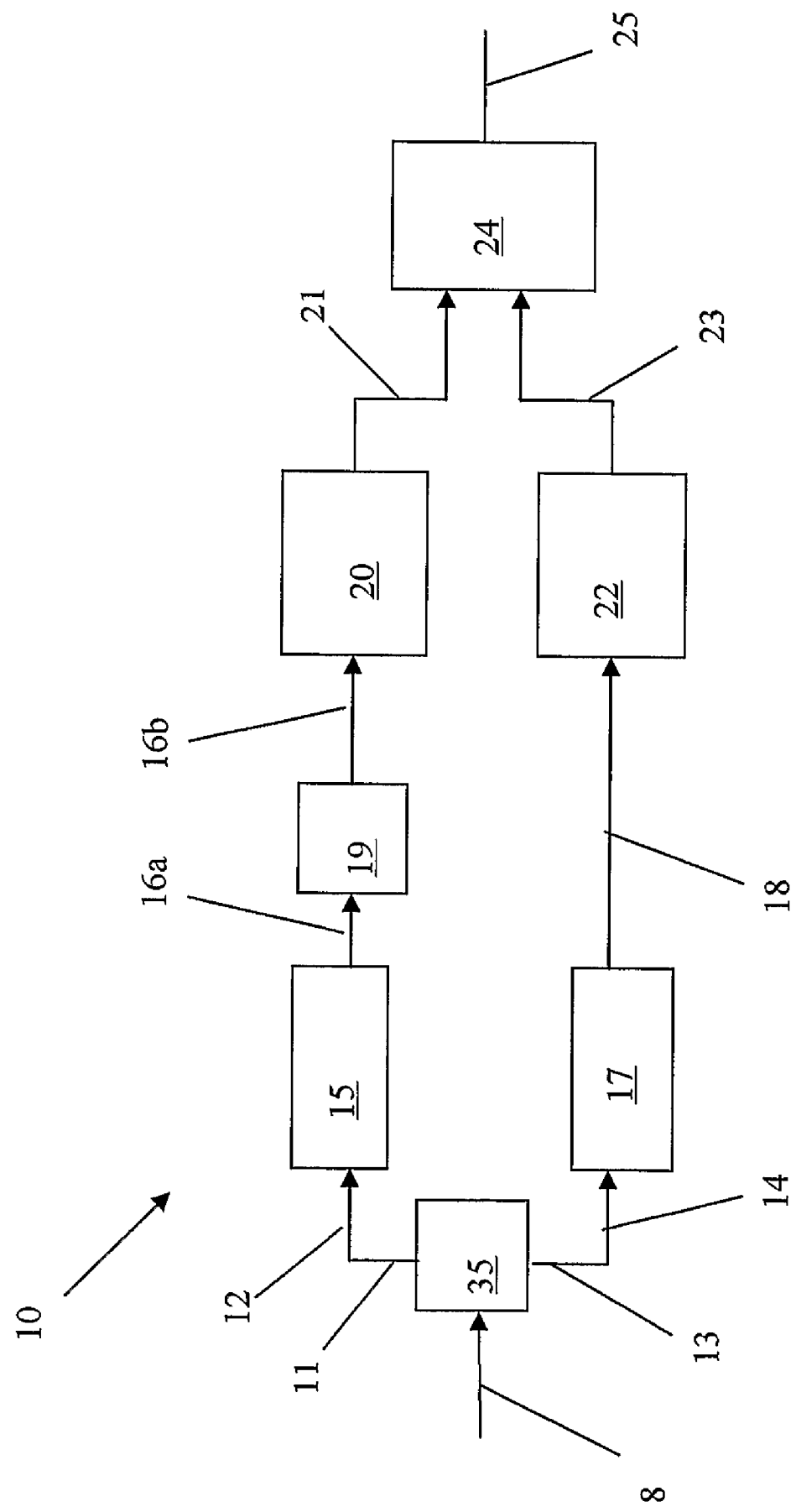
FIG. 2 schematically shows a block diagram according to a first embodiment of the invention.

FIG. 2 schematically shows a block diagram according to a signal processing arrangement 10 according to a first embodiment of the invention. In FIG. 2 the return signal 8, shown in FIG. 1, is by means 35 received and divided into a first branch 11 comprising a first signal 12 and a second branch 13 comprising an identical second signal 14. The first branch 11 is parallel the second branch 13. The signal processing arrangement 10 according to the invention comprises a first compression filter 15 arranged for compressing the first signal 12 and giving rise to a first compressed signal 16a.

The signal processing arrangement 10 further comprises a second compression filter 17 parallel to the first compression filter 15 arranged for compressing the second signal 14 giving rise to a second compressed signal 18.

The second compression filter 17 is arranged to compress the second signal 14 to a higher degree than the first compression filter 15 compresses the first signal 12. The difference in compression between the first compression filter 15 and the second compression filter 17 gives rise to a time delay $\Delta T$ between the first compressed signal 16a and the second compressed signal 18. FIG. 2 shows a delay filter 19 arranged to delay the first compressed signal 16a compensating for the delay $\Delta T$ and giving rise to a delayed first compressed signal 16b.

FIG. 2 shows a first detector 20 arranged to process the delayed first compressed signal 16b by forming the squares or absolute value of the delayed first compressed signal 16b, giving rise to a first detector signal 21. Furthermore, a second detector 22 is arranged to process the second compressed signal 18 by forming the square or absolute value of the second compressed signal 18, giving rise to a second detector signal 23.

FIG. 2 shows a comparison device 24 arranged to compare the first detector signal 21 to the second detector signal 23 for all corresponding time frames. The comparison device 24 is arranged to select the minimum value of the compared detector signals 21, 23 for all time frames. The comparison device 24 gives rise to a first output signal 25 comprising the minimum values from the first and second detector signals 21, 23.

Figure 3:
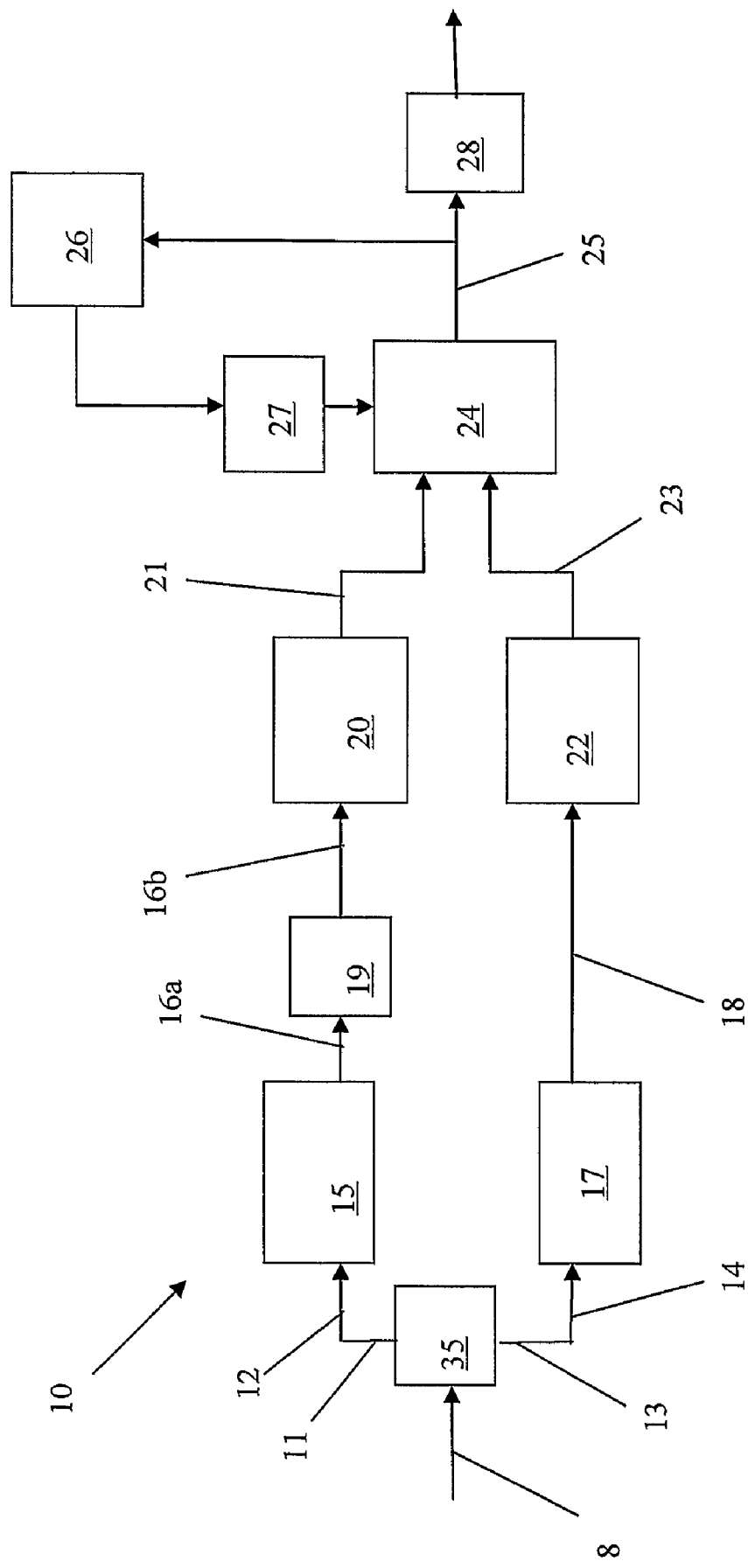
FIG. 3 schematically shows a block diagram according to a second embodiment of the invention, and where.

FIG. 3 schematically shows a block diagram according to a second embodiment of the invention, where a memory device 26 is arranged to store the selections made by the comparison device 24. The memory device 26 stores the selections as a chronological sequence of choices.

FIG. 3 shows a control device 27 arranged to use the stored sequence of selections in the memory device 26 when processing a return signal from a second coded pulse following the first coded pulse 4. The control device 27 is used controlling the comparison device 24 such that the first or the second detector signal 21, 23 from the second coded pulse is selected on basis of the sequence of previously stored selections, thereby giving rise to a second output signal.

The embodiment shown in FIG. 3 also shows a clutter suppressing device 28 that processes the first output signal 25 and the second output signal as coherent signals in order to suppress clutter, for example by Doppler filtering.

Figure 4:
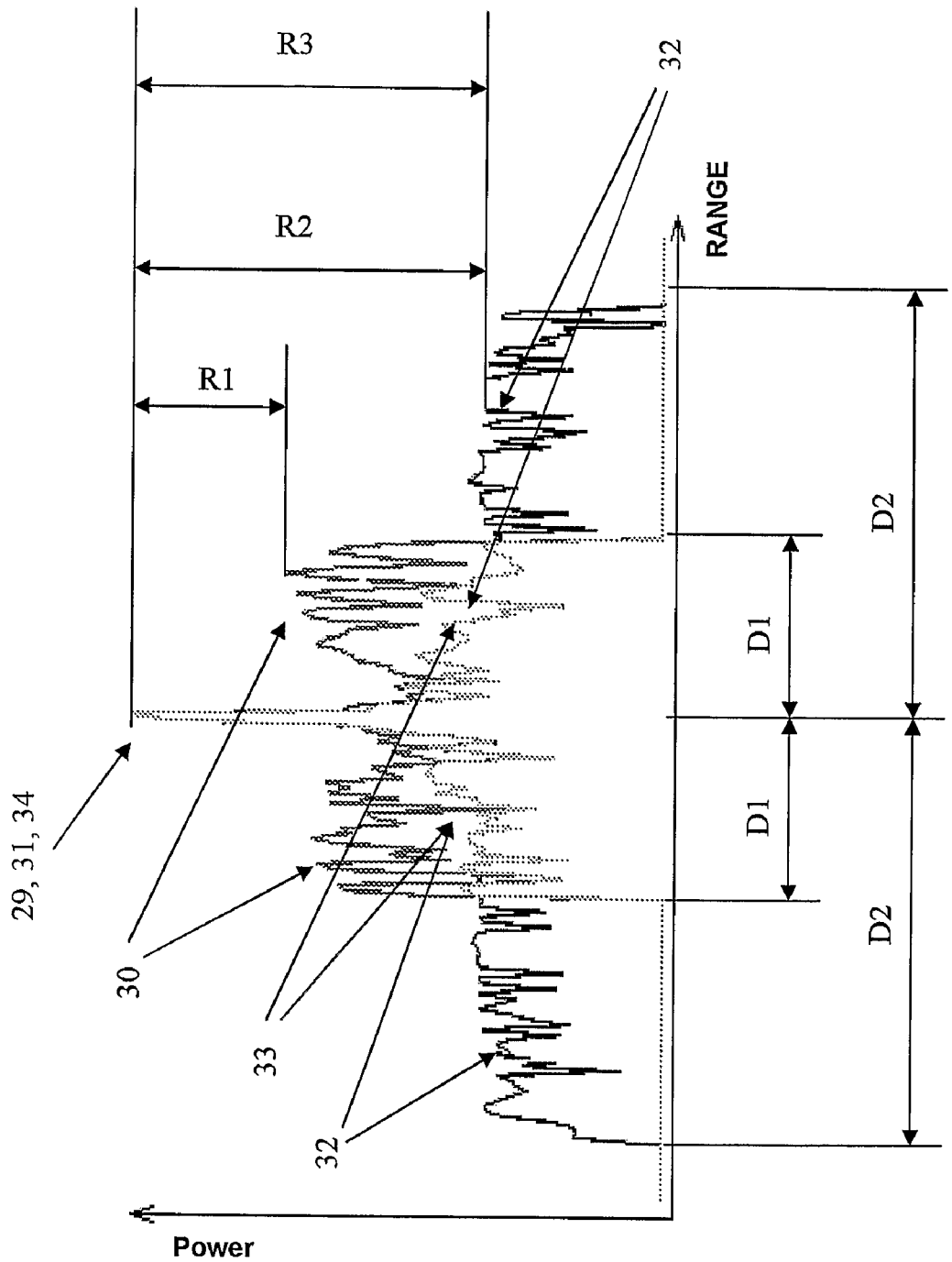
FIG. 4 schematically shows a diagram over detector signals from a short filter and a long filter and an output signal from the arrangement according to the invention.

FIG. 4 schematically shows an example of a diagram over the first detector signal 21, the second detector signal 23 and the first output signal 25 from the signal processing arrangement 10 according to FIG. 2 or FIG. 3. The diagram has power of the signal on the vertical axis and range on the horizontal axis.

The first detector signal 21 has a first main lobe 29 and first side lobes 30 within a first range D1 both before and after the first main lobe 29. As is seen in FIG. 4, the first compression filter 15 gives no response outside D1, i.e. outside one code length both before and after the main lobe.

The second detector signal 23 has a second main lobe 31 and second side lobes 32 within a second range D2 both before and after the main lobe 31.

FIG. 4 shows that the first and second main lobes 29 and 31 have the same power, i.e. the same amplitude, but that the first and second side lobes 30 and 32 have different powers. Furthermore, the first and second ranges D1 and D2 have different length. The first range D1 is less than the second range D2 and the first side lobes 30 have a power exceeding the second side lobes 32. Thus, the side lobe level region corresponding to the first compression filter is narrower than the side lobe level region corresponding to the second compression filter.

The signal processing scheme according to the invention yields an output signal 25 comprising the minimum values of the first and second detector signals 21 and 23, which in FIG. 2 or 3 is shown as the output signal 25. The output signal 25 has no side lobes outside D1, but within D1 the output signal 25 has side lobes 33 corresponding to the minimum values from the first and second detector signals 21 and 23. In FIG. 4 it is also shown that the main lobe 34 in the output signal 25 correspond to any of the main lobes 29, 31 from the first and second detector signals 21 and 23. However, if one of the main lobes 29, 31 would have had somewhat less power, the output signal 25 should have had the main lobe with the lesser power.

FIG. 4 shows a first ratio RI between the first main lobe 29 and the first side lobes 30, and a second ratio R2 between the second main lobe 31 and the second side lobe 32, and a third ratio R3 between the main lobe 34 and the smallest side lobes. The second ratio R2 is larger than the first ratio R1 within the first range D1 because in the example the smallest side lobes correspond to the second side lobes 32 within the first range D1, i.e. the third ratio R3 refers to the second ratio R2 within the first range D1. However, outside the first range D1 the smallest side lobes refer to the non existing side lobes of the first detector signal 21, wherein the third ratio R3 increases outside the first range D1.

The above described embodiments shall not be seen as limiting the invention, but the invention may be amended within the scope of the claims. For example, the first side lobes 30 may have less power than the second side lobes 32 within the first range R1.

The invention claimed is:

1. A method for signal processing for a target detecting device comprising the steps of:
   receiving a return signal from a transmitted first coded pulse by means of a signal processing arrangement;
   compressing the return signal in a first compression filter giving rise to a first compressed signal;
   compressing the return signal in a second compression filter parallel to the first compression filter giving rise to a second compressed signal, wherein;
   the second compression filter compresses the return signal to a higher degree than the first compression filter, wherein a delay $\Delta T$ between the first compressed signal and the second compressed signal arises due to the difference in compression between the first and the second compression filter;
   a delay filter delays the first compressed signal compensating for the delay $\Delta T$;
   a first detector processes the delayed first compressed signal by forming the squares or absolute value of the delayed first compressed signal, giving rise to a first detector signal;
   a second detector processes the second compressed signal by forming the square or absolute value of the second compressed signal, giving rise to a second detector signal;
   the first detector signal is compared to the second detector signal for all corresponding time frames, and that;
   the minimum value of the compared detector signals is selected for all time frames, giving rise to a first output signal comprising the minimum values from the first and second detector signals.

2. A method according to claim 1, characterized in that the method comprises the step of compressing the return signal in the first compression filter by means of optimizing the first compression filter to have zero response outside one code length from the main lobe.

3. A method according to claim 1, characterized in that the method comprises the step of compressing the return signal in the second compression filter by means of optimizing the second compression filter to have low side lobes in the side lobe range corresponding to the first compression filter.

4. A method according to claim 1, characterized in that method comprises the step of compressing the return signal in the first compression filter by means of the first compression filter having a length corresponding to the length of the transmitted coded pulse.

5. A method according to claim 1, characterized in that the method comprises the step of compressing the return signal in the second compression filter by means of the second compression filter having a length at least three times the length of the first compression filter.

6. A method according to claim 1, characterized in that the selections of the minimum value for comparing the detector signals for all time frames, is stored as a sequence of selections.

7. A method according to claim 6, characterized in that method comprises the step of the stored sequence of selections being used when processing a return signal from a second coded pulse following the first coded pulse, such that the sequence of selections determines which of the first or the second detector signal from the second coded pulse is selected and thereby giving rise to a second output signal.

8. A method according to claim 7, characterized in that the method comprises the step of processing the first output signal and the second output signal as coherent signals in order to suppress clutter.

9. A method according to claim 1, characterized in that the method comprises the step of transmitting the first transmitted first coded pulse.

10. A signal processing arrangement for a target detecting device comprising:
- means for receiving a return signal from a transmitted first coded pulse;
- a first compression filter arranged for compressing the return signal and giving rise to a first compressed signal;
- a second compression filter parallel to the first compression filter arranged for compressing the return signal giving rise to a second compressed signal;
- characterized in that the second compression filter is arranged to compress the return signal to a higher degree than the first compression filter,
- wherein a delay $\Delta T$ between the first compressed signal and the second compression signal arises due to the difference in compression between the first and the second filter, wherein;
- a delay filter is arranged to delay the first compressed signal compensating for the delay $\Delta T$;
- a first detector is arranged to process the delayed first compressed signal by forming the squares or absolute value of the first compressed signal, giving rise to a first detector signal;
- second detector is arranged to process the second compressed signal by forming the square or absolute value of the second compressed signal, giving rise to a second detector signal, and wherein;
- a comparison device is arranged to compare the first detector signal to the second detector signal for all corresponding time frames, and that;
- the comparison device is arranged to select the minimum value of the compared detector signals for all time frames, giving rise to a first output signal comprising the minimum values from the first and second detector signals.

11. A signal processing arrangement according to claim 10, characterized in that the first compression filter is optimized such that the first compression filter has zero response outside one code length from the main lobe.

12. A signal processing arrangement according to claim 10, characterized in that the second compression filter is optimized for low side lobes in the side lobe range corresponding to the first compression filter.

13. A signal processing arrangement according to claim 10, characterized in that the length of the first compression filter corresponds to the length of the transmitted first coded pulse.

14. A signal processing arrangement according to claim 10, characterized in that the length of the second compression filter is at least three times the length of the first compression filter.

15. A signal processing arrangement according to claim 10, characterized in that a memory device is arranged to store the selections made selecting the minimum value for comparing the detector signals for all time frames, as a sequence of selections.

16. A signal processing arrangement according to claim 15, characterized in that a control device is arranged to use the stored sequence of selections when processing a return signal from a second coded pulse following the first coded pulse, by controlling the comparison device such that the first or the second detector signal from the second coded pulse is selected on basis of the sequence of selections, thereby giving rise to a second output signal.

17. A signal processing arrangement according to claim 16, characterized in that a clutter suppressing device processes the first output signal and the second output signal as coherent signals in order to suppress clutter, for example by Doppler filtering.

18. A signal processing arrangement according to claim 17, characterized in that the arrangement comprises means for transmitting the first coded pulse.

* * * * *

UNITED STATES PATENT AND TRADEMARK OFFICE
CERTIFICATE OF CORRECTION

PATENT NO. : 7,424,405 B2 Page 1 of 1
APPLICATION NO. : 10/582132
DATED : September 9, 2008
INVENTOR(S) : Eriksson It is certified that error appears in the above-identified patent and that said Letters Patent is hereby corrected as shown below:

In Column 7, Line 51, delete "RI" and insert -- R1 --, therefor.

In Column 9, Line 26, in Claim 10, insert -- a --, before "second detector".

Signed and Sealed this

Thirty-first Day of March, 2009

JOHN DOLL
*Acting Director of the United States Patent and Trademark Office*